United States Patent [19]
Markham et al.

[11] Patent Number: 5,234,543
[45] Date of Patent: Aug. 10, 1993

[54] DEINKING METHOD USING INK AGGLOMERATION

[75] Inventors: Larry D. Markham, Mobile, Ala.; Narendra Srivatsa, Ramsey, N.J.

[73] Assignee: International Paper Company, Purchase, N.Y.

[21] Appl. No.: 771,370

[22] Filed: Oct. 3, 1991

[51] Int. Cl.⁵ .............................................. D21C 5/02
[52] U.S. Cl. ................................ 162/5; 162/55; 210/714; 209/5; 209/17
[58] Field of Search ............... 162/5, 55; 210/195.3, 210/713, 714; 209/3, 5, 17

[56] References Cited

U.S. PATENT DOCUMENTS 3,635,788  1/1972  Braun et al. ............................ 209/5
3,846,227  11/1974 Mestetsky et al. ..................... 162/5

Primary Examiner—W. Gary Jones
Assistant Examiner—Brenda Lamb
Attorney, Agent, or Firm—Ostrager, Chong & Flaherty

[57] ABSTRACT

Deinking of printed paper is accomplished by repulping printed wastepaper in an aqueous medium containing a deinking chemical. The presence of the deinking chemical causes initial agglomeration of ink particles to produce an ink pulp medium. Agglomerated ink particles are removed from the ink pulp medium by size and density separation procedures to separate coarse ink and produce a fine ink particle stream. The fine ink particle stream is recirculated to cause additional agglomeration of ink particles. The reagglomerated ink particles are removed from the fine ink particle stream by size and density separation procedures to produce a substantially ink free pulp medium. The invention provides agglomeration processes with high ink removal from printed paper.

24 Claims, 6 Drawing Sheets

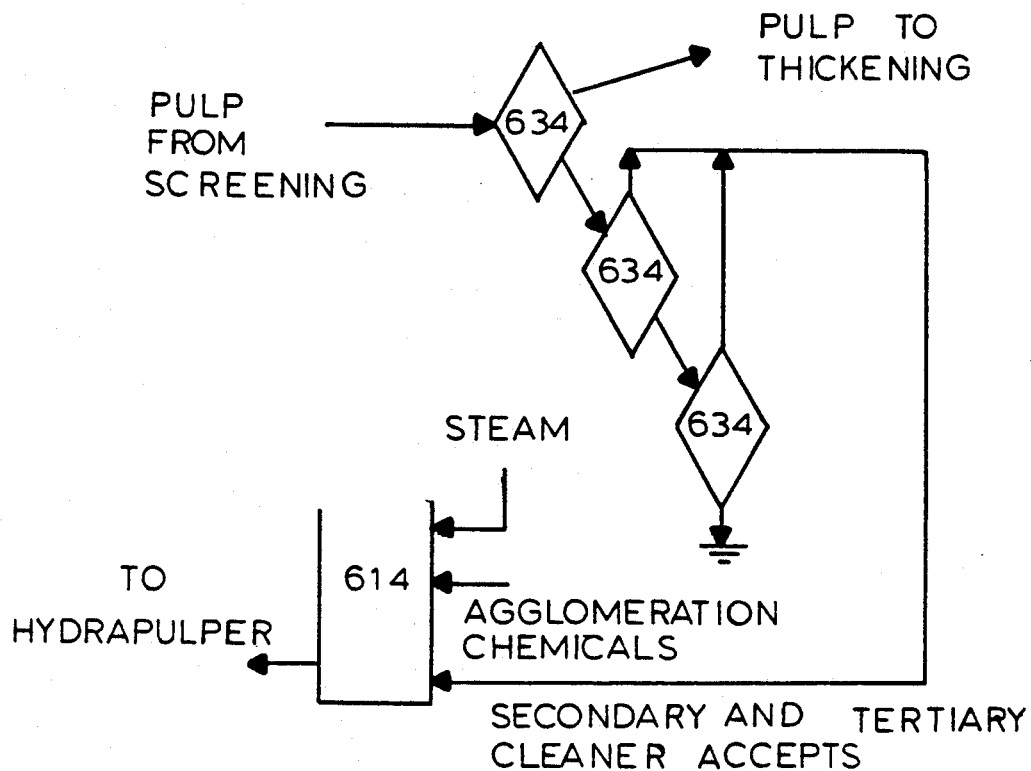
FIG. 6
FIG. 7
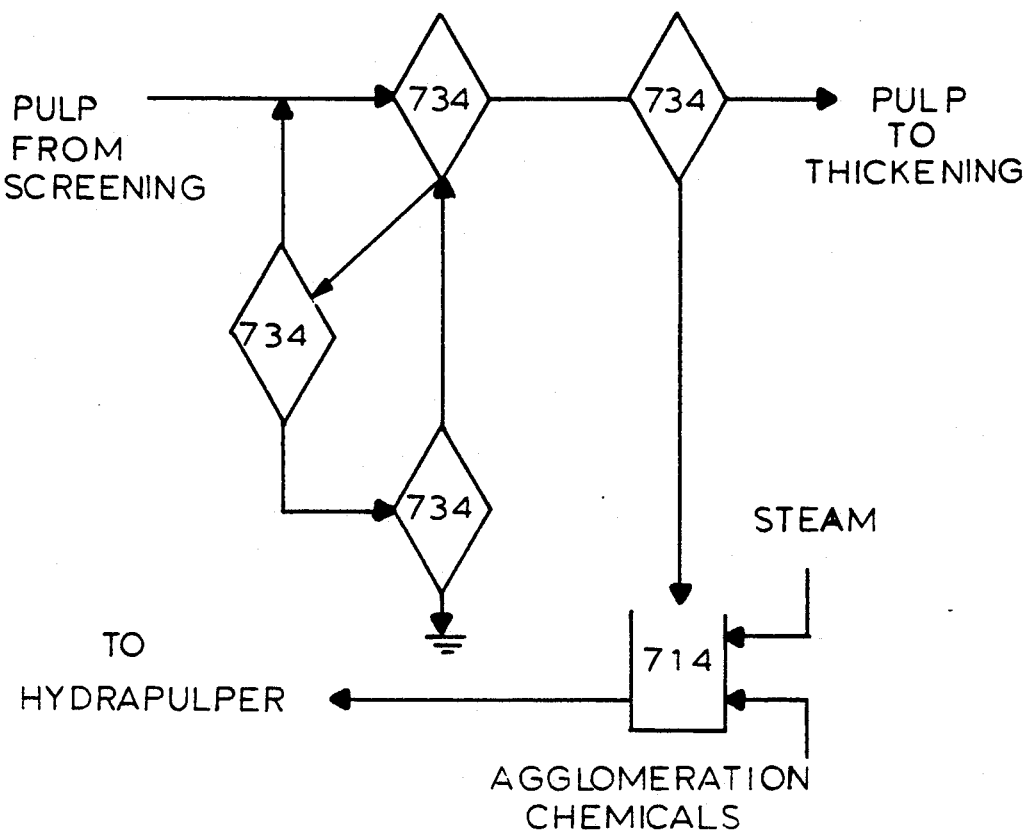

DEINKING METHOD USING INK AGGLOMERATION

FIELD OF INVENTION

This invention generally relates to an improved method to deink printed paper. More particularly, it concerns a process which deinks printed paper by agglomeration and reagglomeration of ink particles which are removed by size and density separation procedures to produce an ink free pulp medium used to make recycled paper and board products.

BACKGROUND ART

In conventional deinking procedures, the paper is mechanically pulped and contacted with an aqueous medium containing a deinking chemical. The pulping and presence of the deinking chemical results in a separation of the ink from the pulp fibers and the dispersed ink is then separated from the pulp fibers by washing or flotation processes.

Increasing amounts of printed paper are being generated today from electrophotographic processes such as xerography and non-impact printing processes such as laser and ink-jet printing. Deinking processes capable of deinking these types of printed paper are very complex and are capital intensive. In addition, multiple steps are required for debris removal and actual ink removal. Generally, ink removal procedures involve washing, flotation, forward cleaning and high consistency dispersion to reach the level of speck removal and brightness required in the deinked pulp to produce recycled paper.

As an alternative to conventional deinking procedures, the prior art has shown use of agglomeration deinking processes. Agglomeration chemicals consisting of polymeric systems are employed to aid in the ink agglomeration process. In deinking paper through agglomeration the waste paper is repulped and deinked through chemical treatment to provide a slurry of pulp and ink agglomerates. The ink agglomerates are removed from the pulp through a variety of separation procedures.

U.S. Pat. No. 4,013,505 to Balcar et al. discloses a method of deinking printed wastepapers by impregnating the wastepaper with surface active agents so that upon repulping the ink particles are released from the paper fibers. Adsorptive flakes comprised of solutions of metal soaps of fatty acids are added to the repulped paper stock to cause precipitation of the separated ink particles. The adsorptive flakes containing printing ink are separated from the repulped paper stock by latent vortex action.

U.S. Pat. No. 4,076,578 to Puddington et al. discloses a method for deinking wastepaper, particularly newsprint, in which ink coated solids are removed by physical means such as hydrocyclones, screens or decantation.

The methods in Balcar and Puddington provide processes which require the use of expensive deinking agents and involve complex process steps to remove ink particles to produce a relatively clean paper stock.

Therefore, known deinking processes are not entirely satisfactory in that high concentrations of expensive chemicals are necessary to obtain deinking and adequate pulp cleanliness is not achieved. Thus the present practice, employing known deinking processes require complex and expensive procedures to obtain recycled grade paper.

There is a need in the art for processes which are less complex to produce recycled paper. This invention is directed to the provision of such processes which have wide range applications in creating recycled paper with a high level of cleanliness, and using a low dosage of agglomeration chemical.

Accordingly, it is a broad object of the invention to provide a deinking process and related apparatus for the agglomeration of ink particles from wood containing and wood free grades of paper.

Another object of the invention is to provide a low cost agglomeration deinking process and apparatus that effectively and efficiently removes ink particles without using high concentrations of expensive agglomeration chemicals.

A still further object of the invention is to provide a recycled paper product having a high level of cleanliness made by the agglomeration deinking method of the invention from printed wastepaper.

A more specific object of the invention is to improve the yield of the agglomeration deinking process by reducing the amount of paper fiber which is rejected from the process system in the centrifugal cleaners.

Another object of the invention is to improve the removal of fine ink particles which normally must be removed in a washing process which entails substantial production of deinking sludge.

Another object of the invention is to increase the pulp brightness by removing the fine ink which reduces brightness, and thereby achieve a reduction in the requirement for expensive bleaching chemicals.

DISCLOSURE OF INVENTION

In the present invention, these purposes, as well as others which will be apparent, are achieved generally by providing a process for deinking printed paper by agglomeration and reagglomeration of ink particles. Size and density separation procedures are employed to remove coarse and fine agglomerated ink particles and produce an ink free pulp medium for use in the fabrication of recycled paper.

The general deinking process comprises the steps of repulping the printed paper in an aqueous medium containing a deinking chemical. The presence of the deinking chemical causes initial agglomeration of ink particles to produce an ink pulp medium. The repulping and initial agglomeration is done simultaneously in a repulping vessel. The ink pulp medium is passed through a pressure screen and/or a centrifugal cleaner to remove large ink particles and to produce a fine ink particle stream. The fine ink particle stream is then recirculated to the repulping vessel with further application of deinking chemicals and steam to cause additional agglomeration of ink particles. After reagglomeration, the agglomerated ink particles are removed to produce a substantially ink free pulp medium. The substantially ink free pulp medium is then made into a recycled paper product through conventional papermaking processes.

In an alternate embodiment of the process of the invention, an agglomeration tower is employed to separate the repulping and agglomeration steps. The printed paper is first repulped in a repulping vessel to produce a pulp medium and thereafter is passed to an agglomeration tower, containing the deinking chemical. The pulp medium may be subjected to screening and cleaning procedures to remove contaminants, such as staples, glass, paper clips, plastic and stickies prior to agglomeration in the agglomeration tower. The deinking chemical present in the agglomeration tower causes initial agglomeration of ink particles to produce an ink pulp medium. The ink pulp medium is passed through a pressure screen and/or a centrifugal cleaner to remove large ink particles and to produce a fine ink particle stream. The fine ink particle stream is then recirculated to the agglomeration tower to cause additional agglomeration of ink particles. After reagglomeration, the agglomerated ink particles are removed to produce a substantially ink free pulp medium which can then be made into a recycled paper product.

Any deinking chemical capable of causing agglomeration of the ink particles can be employed. For example, the deinking compounds Sansink PX-101 and Sansink PM-201 available from PPG Industries, Inc., Pittsburg, Pa. are suitable, as are other commericial deinking compounds.

Process and reaction conditions are controlled in the repulping vessel or agglomeration tower so that effective agglomeration of the ink particles is accomplished. Concentrations of the deinking chemical, as well as the pH and temperature of the aqueous medium are adjusted to yield maximum agglomeration of the ink particles. Coarse and fine ink particles are removed from the ink pulp medium by size and density separation and the fine ink particle stream is reagglomerated and recirculated. The resulting ink free pulp medium has a speck removal and brightness level sufficient to produce high-grade recycled paper.

Preferred applications of the method of the invention include use in deinking printed paper to produce high-grade recycled printing and writing paper, or other products such as tissue and towelling, bag grades or board products. Advantageously, the deinking method of the invention provides agglomeration processes that are less complex and expensive than known agglomeration processes.

The invention also provides an apparatus for deinking printed paper utilizing a repulping means, an agglomeration means, a separation means for coarse ink and fine ink, a recirculation means for fine ink and a production means to produce recycled paper.

Other objects, features and advantages of the present invention will be apparent when the detailed description of the preferred embodiments of the invention are considered in conjunction with the drawings, which should be construed in an illustrative and not limiting sense as follows:

BRIEF DESCRIPTION OF THE DRAWINGS

FIGS. 6 and 7 are various embodiments of the process steps of the invention for removing large ink particles from the ink pulp medium and for recirculating the fine ink particle stream to cause additional agglomeration.

DETAILED DESCRIPTION OF THE PREFERRED EMBODIMENT

Figure 1A:
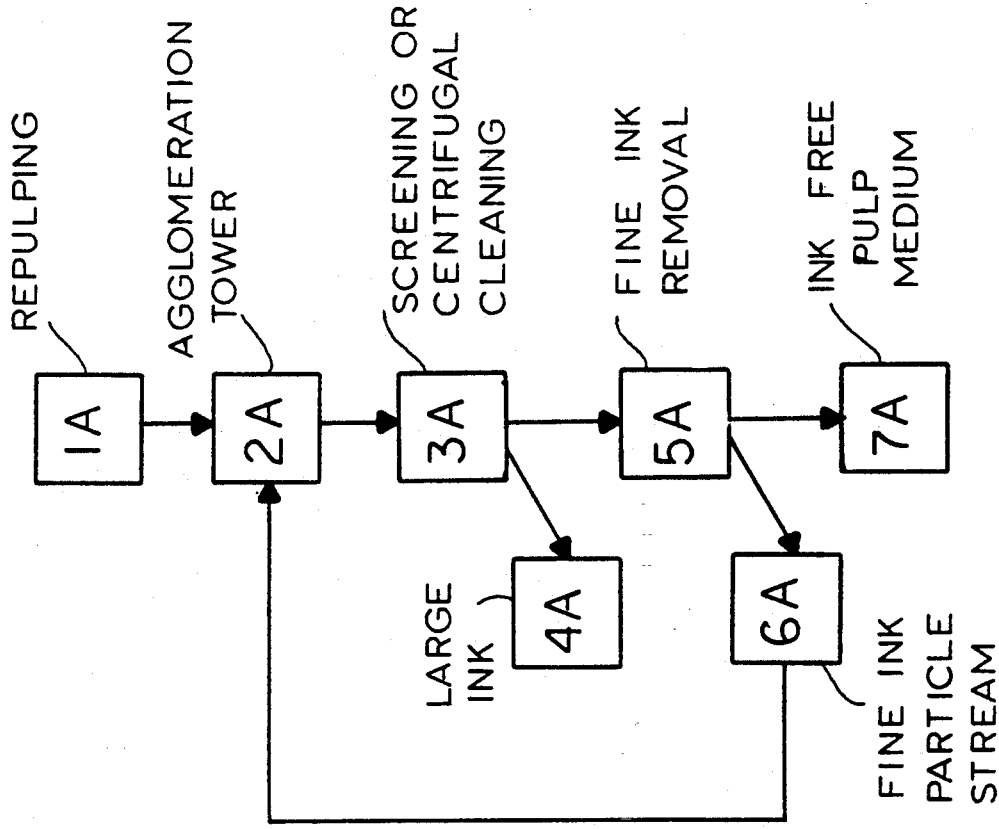
FIG. 1A is a diagrammatic view of another embodiment of the general process steps of the invention for deinking of printed paper using an agglomeration tower.
Figure 1:
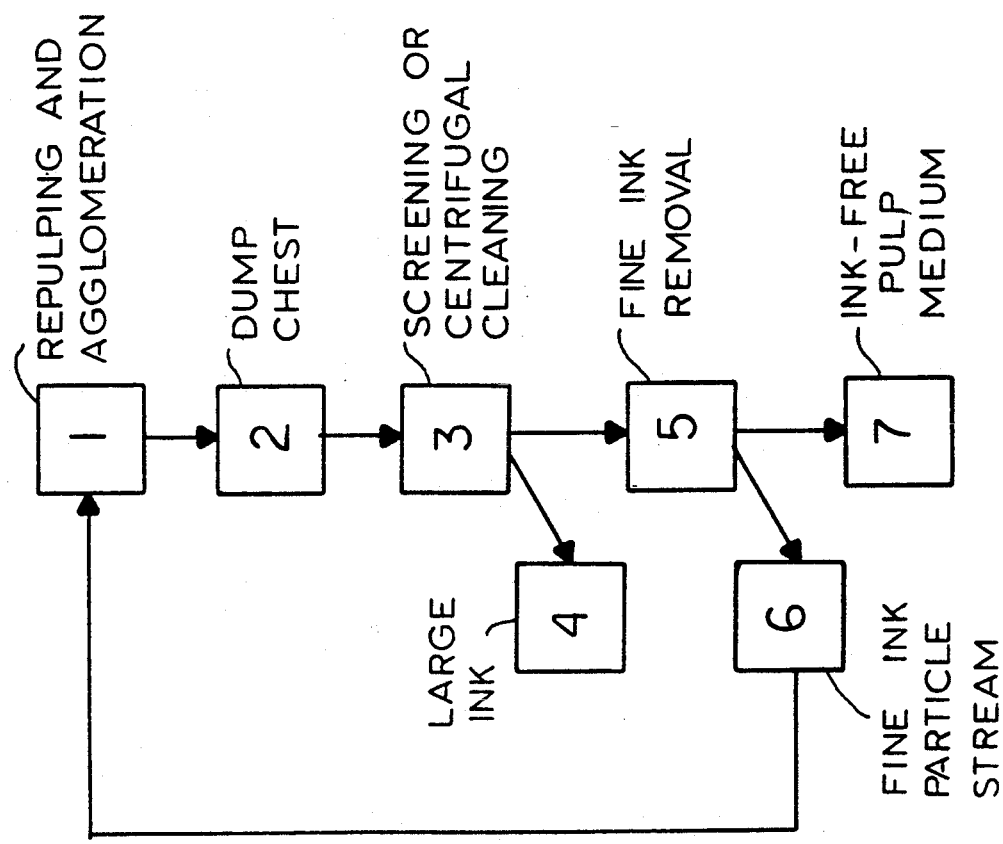
FIG. 1 is a diagrammatic view of the general process steps of the invention for deinking of printed paper.

With further reference to the drawings, FIG. 1 is a diagrammatic view of the general process steps for the deinking of printed paper.

Repulping of the printed paper occurs in a repulping vessel containing a deinking chemical 1. The presence of the deinking chemical causes initial agglomeration of ink particles to produce an ink pulp medium. The resulting ink pulp medium is passed to a dump chest 2 and then through one or more steps of screening or centrifugal cleaning 3, to remove large ink particles and contaminants 4. The ink pulp medium is then passed through a centrifugal cleaner 5 to remove the fine ink 6. The fine ink particle stream is then recirculated into the repulping vessel 1 with further application of deinking chemicals and steam to cause additional agglomeration of ink particles. After centrifugal cleaning 5, a substantially ink free pulp medium 7 is produced.

In an alternate embodiment of the process of the invention, an agglomeration tower is employed to separate the repulping and agglomeration steps. See FIG. IA. The printed paper is first repulped in a repulping vessel IA and thereafter passed to an agglomeration tower 2A. Prior to reaching the agglomeration tower the repulped fibers may be subjected to screening and cleaning procedures to remove contaminants, such as staples, glass, paper clips, plastic and stickies prior to agglomeration. The deinking chemical is present in the agglomeration tower which causes initial agglomeration of ink particles to produce an ink pulp medium. The ink pulp medium is passed through a pressure screen and/or a centrifugal cleaner 3A to remove large ink particles 4A. The ink pulp medium is then passed through a centifugal cleaner 5A to remove the fine ink 6A. The fine ink particle stream is then recirculated into the agglomeration tower 2 to cause additional agglomeration of ink particles. After centrifugal cleaning 5A, a substantially ink free pulp medium 7A is produced.

The substantially ink free pulp medium can then be made into a recycled paper product through conventional papermaking techniques.

Figure 2:
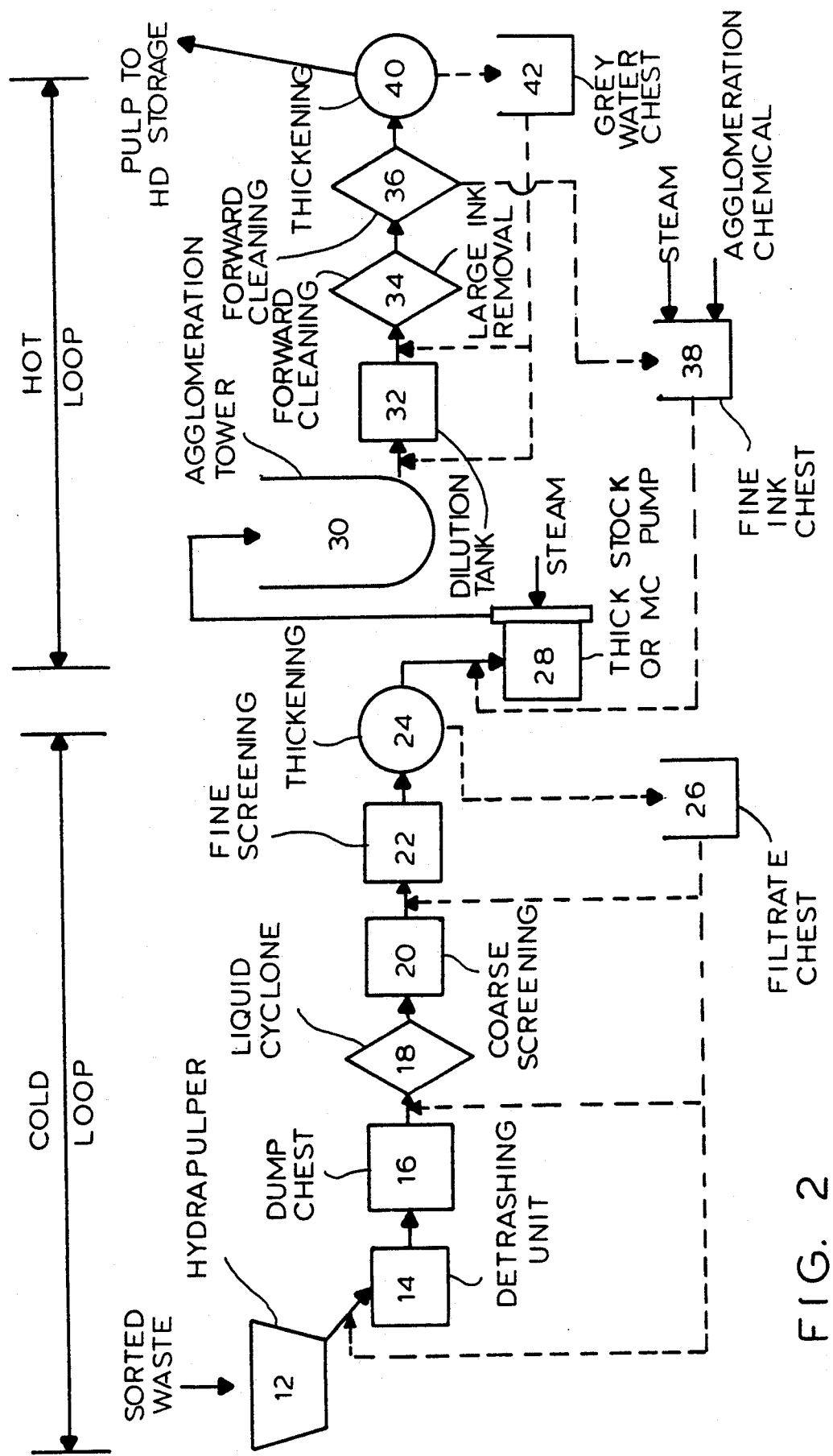
FIG. 2 is a schematic view of an apparatus for deinking of printed paper in accordance with the process of the invention.

FIG. 2 is a schematic view of an apparatus, generally designated 10, for practicing the deinking process of the invention. The process of the invention entails repulping the wastepaper, causing agglomeration of the ink particles with the addition of a deinking chemical in aqueous medium, separating the coarse and fine ink from the fiber and reagglomerating the fine ink to a size and density for removal by screening and forward cleaning.

As shown in FIG. 2, contaminant removal is achieved in the first part of the system by passing the printed wastepaper through hydrapulper 12, detrashing unit 14, dump chest 16, liquid cyclone 18, coarse screening 20, fine screening 22, pulp thickening station 24 and filtrate chest 26. Ink removal is achieved in the latter part of the system by passing the pulp containing medium from the pulp thickening station 24 to station 28, where steam is added, and then on to the agglomeration tower 30, dilution tank 32, forward cleaning stations 34 and 36, and fine ink chest 38.

The printed paper is repulped in an aqueous medium at hydrapulper 12. In an embodiment of the invention, the printed paper is cellulosic material including both wood containing and wood free grades of paper. Various types of printed paper may be used in this invention including computer printout paper, writing paper, fine paper, coated and uncoated magazine paper, newsprint and packaging board. This list is merely representative of the different types of printed paper and is not considered to be inclusive of all the possible types of printed paper which may be used in the invention.

The sorted printed waste paper is slushed at consistency range between 3 and 30%, in the hydrapulper. The repulping is preferably done in an alkali aqueous medium, with sodium hydroxide added to speed the repulping and to aid in the separation of ink particles from the pulp fibers. Ambient temperature is preferred when using highly contaminated waste in the hydrapulper since at higher temperatures contaminants, such as stickies, would break down making them difficult to remove. The pulp-containing medium is then passed to a detrashing unit 14, which removes large contaminants such as large pieces of plastic or metal, and thereafter a dump chest 16.

The pulp containing medium is then pumped through a liquid cyclone 18, for removal of heavy contaminants, such as paperclips, staples and glass. The following coarse screens 20, typically have hole sizes in the range of 0.040" to 0.062", and the fine screens 22, have slots of width between 0.006" to 0.012". Preferably, secondary and tertiary screening stages are often used for both coarse and fine screening to reduce the loss of good fiber from the system.

The slotted screens 22, remove a large percentage of the stickies from the system, including adhesives from self-stick envelopes and labels. Removal of the stickies is critical during the deinking process. High efficiency stickies removal by the fine screens is achieved in the system by maintaining the screening temperature at close to ambient temperature, so that the stickies do not become softened and more deformable for extrusion through the slots into the pulp accepts stream.

The pulp-containing medium is thickened to approximately 12-16% consistency, at station 24, and then pumped using a medium consistency pump 28, to the agglomeration tower 30. The pump acts as a mixer for the deinking chemical, and as a steam mixer as well, if steam is added at this point. The agglomeration tower is operated at temperatures in the range of 30° C. to 80° C., and continuous gentle agitation is used to improve the contact between the ink particles so that they will readily coalesce.

At discharge from the agglomeration tower, the pulp is diluted to 1% consistency or less at dilution tank 32, for pumping through a set of forward cleaners (centrifugal cleaners) 34, 36, for removal of the agglomerated ink particles. The large ink particles are easily separated into the cleaner rejects, and are removed from the system for disposal by landfilling or burning or for other uses. However, the fine ink particle stream 38, is recirculated into the agglomeration tower 30. High efficiency in the cleaners 36 is required for fine ink removal which is achieved by using a smaller diameter cleaner operating at a higher reject rate, using a higher pressure drop or a lower pulp consistency.

The fine ink particle stream is heated with steam to high temperature, ranging between 40° C. and 95° C. for a retention time of 0.5 to 60 minutes, to improve the agglomeration. The deinking chemical is preferably added to the fine ink chest 38, so that a high concentration of the chemical is available to work on the ink that was not initially agglomerated on the first pass. The hot stream of reagglomerated fine ink, together with the deinking chemical is added to the main pulp stream prior to the medium consistency pump 28, which feeds the agglomeration tower 30. The ink in the main stream is also agglomerated, but at a lower chemical concentration than for the side stream of fine ink. The reagglomerated fine ink particles act as seed material to promote agglomeration of the fresh ink, thereby improving the efficiency of ink removal on the fresh ink.

After reagglomeration, the ink particles are removed by forward cleaning 34, 36, to produce a substantially ink free pulp medium. The ink free pulp is thickened 40, and used to make recycled paper by conventional papermaking techniques.

Any deinking chemical capable of causing agglomeration of ink particles can be employed. The agglomeration chemical may be chosen to be suitable for the type of wastepaper being used. For example, the deinking compounds Sansink PX-101 (modified alkyl ethyoxylated alcohol blend) and Sansink PM-201 (polymeric hydrocarbon dispersion in water) available from PPG Industries, Inc., Pittsburg, Pa. are suitable, as are other commericial deinking compounds.

Figure 3:
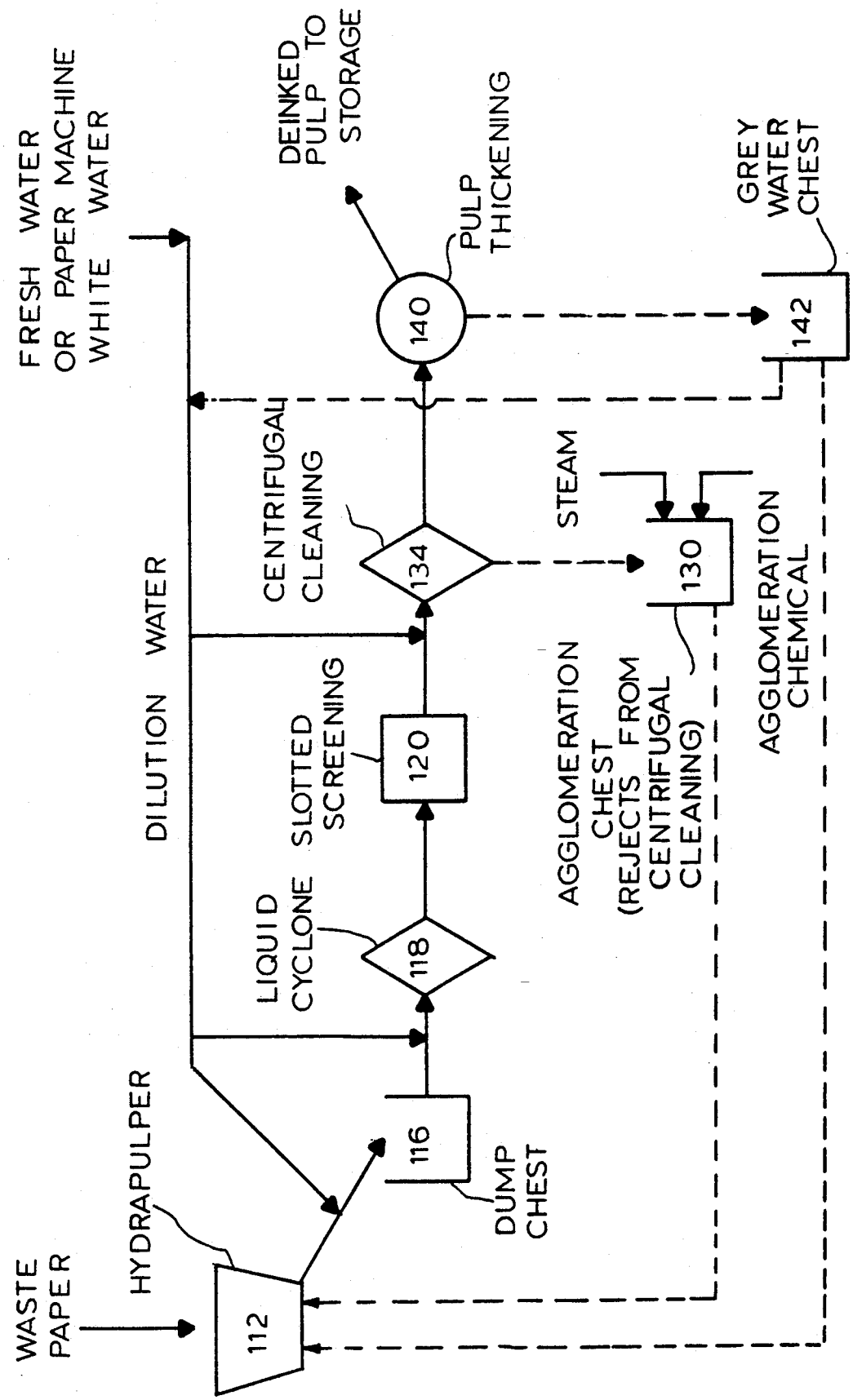
FIG. 3 is a schematic view of another embodiment of the apparatus of the invention for deinking relatively clean printed wastepaper in accordance with the process of the invention as shown in FIG. 4.

For decreasing lightweight contaminants, including hot melts, stickies, wax, latex, adhesives, styrofoam and lightweight plastics, the deinking process of the invention can include a number of additional steps. The use of reverse cleaners, through-flow cleaners or combination cleaners which remove both heavy and light debris can be effective. However, the lightweight rejects often require complicated systems such as dissolved air flotation for their removal and disposal. In an alternate embodiment of the invention, after passing through the slotted screens 120, as shown in FIG. 3, the pulp accepts stream is processed through lights removal cleaners. The lightweight rejects are treated with agglomeration deinking chemicals causing the small lightweight contaminants to agglomerate thus increasing their particle size and/or density. Any type of agglomeration chemical or combination of chemicals can be used in this process. These larger contaminants are then reintroduced into the system prior to the screening and forward cleaning stages, preferably back into the hydrapulper, and are subsequently removed during the screening and forward cleaning stages. The temperature, chemical conditions and chemical addition points used for agglomeration of the lightweight contaminants can be varied. In addition, the agglomerated lightweight contaminants have an attraction for ink particles and act as seed material around which the ink agglomerates thus increasing removal efficiency and enhancing the cleanliness and fiber yield of the resulting pulp.

Flotation deinking can be used for additional ink removal, but this step should not be necessary. Also, to achieve a brightness increase in the final ink free pulp medium dissolved air flotation or clarification can be used on the grey water 42, from the final pulp thickener.

Another alternative embodiment, is the replacement of the first set of forward cleaners 34 with pressure screens having fine slots, between 0.006" to 0.012" slot width, for removal of the large agglomerated ink particles. Preferably the ink pulp medium, at consistencies ranging from 0.5-6.0% and temperatures from 25°-55° C., is passed through the slotted pressurized screens to remove contaminants and large ink particles.

In yet another alternative embodiment, additional sets of forward cleaners can be added for further improvement in the cleanliness of the pulp.

The agglomeration tower, 30, can also be used for bleaching the pulp, since the temperature and pulp consistency conditions are suitable. Multiple stage bleaching could be accomplished in the tower because of its design for continuous gentle agitation.

Figure 4:
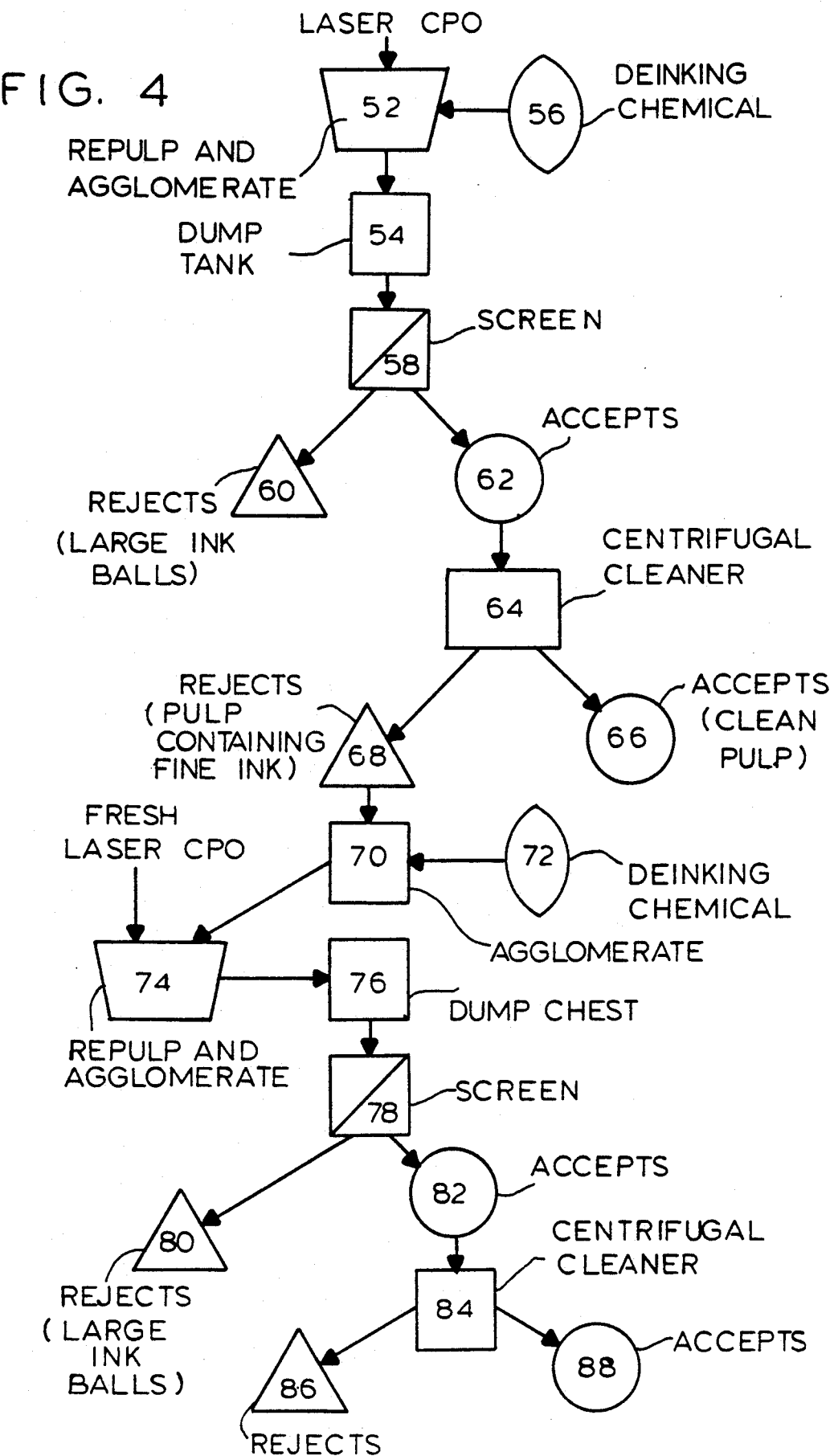
FIG. 4 is a diagrammatic view of another embodiment of the process steps of the invention for deinking clean printed waste paper as used in Examples I through IV.
Figure 5:
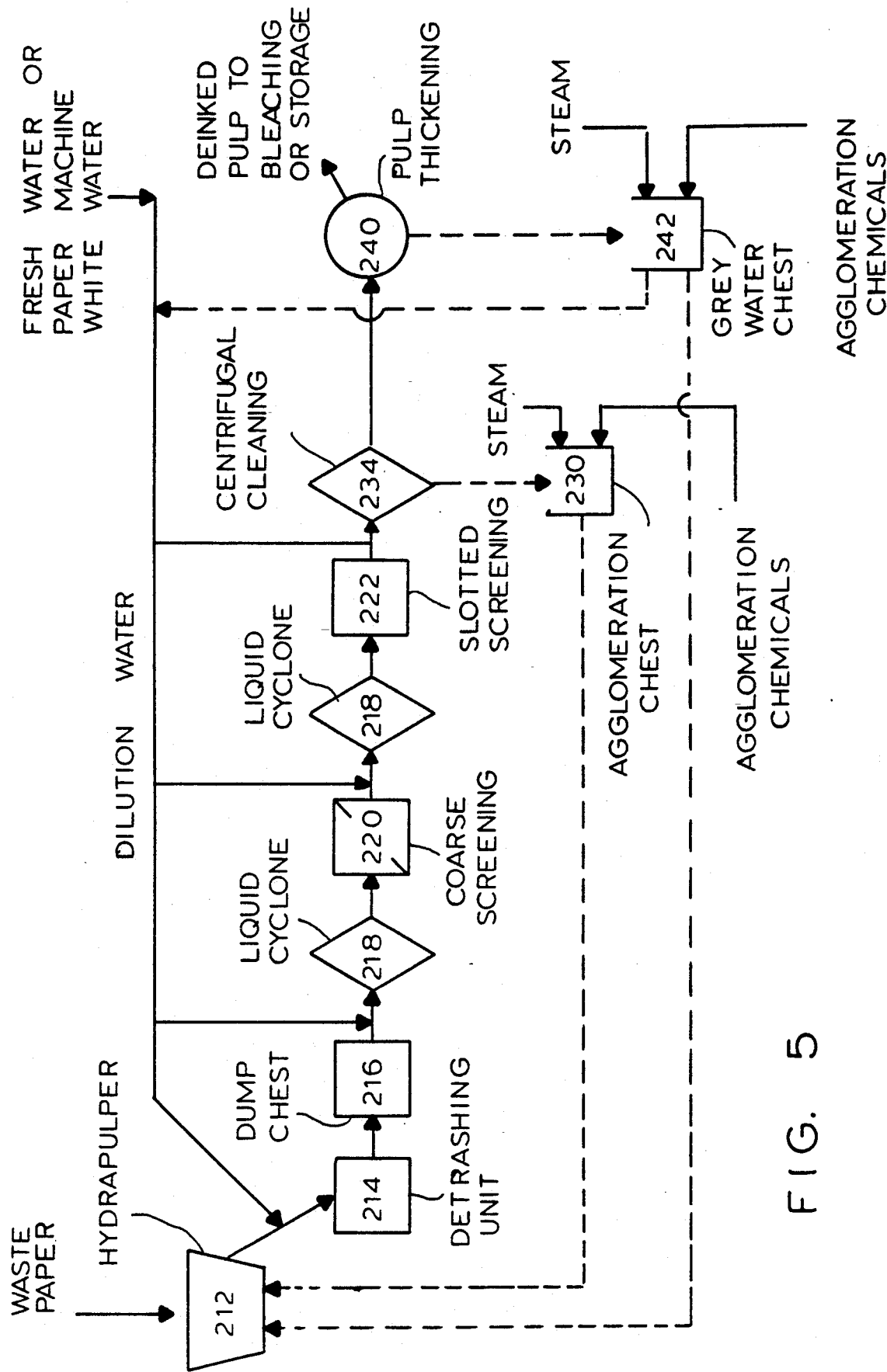
FIG. 5 is a schematic view of another embodiment of the apparatus of the invention for deinking contaminated wastepaper in accordance with the process of the invention.

FIGS. 3 and 5 are representative of further embodiments of the apparatus of the invention for deinking clean printed wastepaper and contaminated wastepaper, respectively. In FIG. 5, side stream reagglomeration of both the fine ink particle stream in the centrifugal cleaner rejects and the fine ink particle stream in the filtrate from the pulp washer/thickener is shown. FIG. 4 is a diagrammatic outline of the process steps of the embodiment for deinking clean printed wastepaper, as used in Examples I through IV.

FIGS. 6 and 7 are further illustrations of various embodiments of the invention showing methods of removing the larger ink particles from the ink pulp medium while recirculating and reagglomerating the fine ink particles. In FIG. 6, the coarse ink is rejected from the system in the tertiary cleaner rejects, whereas the fine ink present in the secondary and tertiary cleaner accepts is recirculated for reagglomeration. In FIG. 7, the coarse ink is removed from the system in the tertiary rejects at the first cleaning stage, and the fine ink in the primary rejects at the second cleaning stage is reagglomerated. Many other variations are possible where the coarse ink is removed and the difficult to remove fine ink is recirculated and reagglomerated.

In the following examples, deinking of printed paper was obtained by the process line as shown in FIG. 4. As shown in Example I, the printed wastepaper was repulped with a deinking chemical to produce an ink pulp medium. Removal of the ink particles from the ink pulp medium was achieved by size and density separation by passing through a screen and a centrifugal cleaner. In Example II, the fine ink rejects stream from the centrifugal cleaner operation of Example I is reagglomerated, whereby ink particles are further removed by size and density separation procedures to produce a substantially ink free pulp medium.

In addition, Examples I through IV below, show printed wastepaper treated with a deinking chemical and process steps of the invention. The deinking agent used in Examples I and II is a of one or more $C_5$-$C_{20}$ alkanols and nonionic surfactants. The deinking agent used in Examples III and IV is a mixture of Sansink PX-101 and PM-201 from PPG Industries, Inc., Pittsburg, Pa.

These examples are merely representative and are not inclusive of all the possible embodiments of the invention.

EXAMPLE I

Five (5) pounds of computer printout (CPO) grade wastepaper containing a majority of laser-printed material was repulped in a 2 foot diameter Hydrapulper at 70° C. and at 5.5% pulp consistency. The pH of the pulp containing medium was adjusted to 10 by adding sodium hydroxide (NaOH) solution, and a 1.0% dosage of the deinking chemical was used (calculated on the basis of oven dry pulp). After 30 minutes of repulping, the mean size of the ink specks in the ink pulp medium was 0.046 sq. mm, as measured using a Cambridge Instruments Quantimet 970 image analyser and the TAPPI Dirt Estimation Chart in TAPPI Method T 213.

The ink pulp medium was then diluted and screened on a vibrating slotted flat screen having a slot width of 0.010", to remove large agglomerated ink specks and other contaminants, such as staples, dirt and stickies. The screen rejects had a dirt (ink) count of 3110 ppm, and a mean speck size of 0.233 sq.mm. Little ink was actually removed from the ink pulp medium during the screening step since most of the ink specks were not sufficiently large to be rejected by the screen.

The ink pulp medium which was accepted by the flat screen was then cleaned using a 3" diameter centrifugal cleaner, to remove the remaining ink specks. The pressure drop across the cleaner was 30 psi. Approximately 30% of the feed pulp to the cleaner was contained in the cleaner rejects stream. Based on the number of specks in the feed pulp and in the accept pulp, the efficiency of the centrifugal cleaning was approximately 47%. The pulp accepted by the cleaner had a dirt count of 190 ppm.

EXAMPLE II

In this example, the rejects stream from the centrifugal cleaning operation in Example I was reagglomerated in a mix tank for 30 minutes at 90° C., using a pH of 10 and 5% of the deinking chemical (calculated on the basis of oven dry pulp). Four (4) pounds of fresh CPO was then repulped with one pound of the reagglomerated centrifugal cleaner rejects from Example I. The repulping was carried out at 70° C. and pH 10, for 30 minutes at 5.5% consistency. No additional deinking chemical was added, other than that which was contained in the reagglomerated centrifugal cleaner rejects. The mean size of the ink specks after 30 minutes of repulping was 0.116 sq. mm.

The ink pulp medium was then diluted and screened on a 0.010" flat screen. The screen rejects had a dirt count of 14500 ppm, and the mean speck size was 0.522 sq.mm. This result indicated that a large amount of ink was removed from the ink pulp medium during the screening step, and that the agglomerated ink particles were much larger than in Example I.

The screen accepts stream was then processed through a 3" diameter centrifugal cleaner using a pressure drop of 30 psi and a 30% reject rate. The accepts stream from the cleaner had a dirt count of 94 ppm, and the dirt removal efficiency of the cleaner was approximately 92%.

Table I below shows the comparison results from Example I and II.

TABLE I

COMPARISON OF DEINKING PROCESS RESULTS IN EXAMPLES I AND II

| | EXAMPLE I | EXAMPLE II |
|---|---|---|
| HYDRAPULPER: MEAN SIZE OF AGGLOMERATED INK PARTICLES (sq. mm.) | 0.046 | 0.116 |
| SCREEN REJECTS: DIRT COUNT (ppm) | 3110 | 14500 |
| SCREEN REJECTS: MEAN SIZE OF SPECKS (sq. mm.) | 0.233 | 0.522 |
| CLEANER EFFICIENCY (%) | 47 | 92 |
| CENTRIFUGAL CLEANER ACCEPTS PULP: DIRT COUNT (ppm) | 190 | 94 |

As shown in Table I, the addition of reagglomerated centrifugal cleaner rejects to the Hydrapulper: increases the size of the agglomerated ink, increases the amount of ink rejected by the screen, improves the centrifugal cleaner efficiency and increases the cleanliness of the final pulp.

EXAMPLE III

Computer printout paper (CPO), containing non-impact printing, was repulped at 70° C., pH 10 and 5% consistency. A dosage of 1% Sansink PM-200 and 0.3% Sansink PX-101 was added to the pulper. After 30 minutes, the ink pulp medium was screened using a 0.007" slotted screen, and then cleaned using a 3" diameter centrifugal cleaner. The results of the mean size of the ink particles after agglomeration in the pulper, the screen rejects, the cleaner rejects and the % ink removal in the screening step are shown in Table II below.

EXAMPLE IV

The rejects stream from the centrifugal cleaning in Example III was reagglomerated at 75° C. for 20 minutes at pH 10, using a chemical dosage of 4% PM-200 and 1.2% PX 101 based on dry pulp.

The mean size of the ink particles increased from 0.088 to 0.240 sq. mm. during the reagglomeration process. The reagglomerated rejects were mixed with fresh CPO in the pulper, using 80% CPO and 20% rejects, for 30 minutes at pH 10, 70° C. and 5% consistency. The resulting ink pulp medium was screened and cleaned as in Example III. The results of the mean size of the ink particles after agglomeration in the pulper, the screen rejects, the cleaner rejects, the dirt count in the screen rejects and the dirt count in the final accepted pulp are shown in Table II below. From the data shown, the reagglomeration method as used in Example IV shows a substantial increase in the size of the ink particles, which improved the screening efficiency for ink removal and improved the cleanliness of the final pulp.

TABLE II

COMPARISON OF DEINKING PROCESS RESULTS IN EXAMPLES III AND IV

| | III | IV |
|---|---|---|
| Mean Size of Ink Particles - After agglomeration in the pulper (sq. mm.) | 0.088 | 0.191 |
| Mean Size of Ink Particles - Screen rejects (sq. mm.) | 0.479 | 0.757 |
| Mean Size of Ink Particles - Cleaner rejects (sq. mm.) | 0.087 | 0.149 |
| Screen rejects: Dirt count (ppm) | 49,700 | 124,000 |
| Centrifugal cleaner accepts pulp: Dirt count (ppm) | 92 | 26 |

Examples I through IV show a variety of printed wastepaper treated with the process steps of the invention under varying process and reaction conditions. In general, all the examples showed effective reagglomeration of fine ink particles which were easily removed from the ink pulp medium by size and density separation method to produce a substantially ink free pulp medium. The substantially ink free pulp medium has speck removal and brightness levels sufficient to produce high-grade recycled paper through conventional papermaking processes.

The simplicity of the equipment used and the high amount of ink removal make the agglomeration deinking process of the invention advantageous over prior art practice.

Advantageously, the method of this invention for deinking printed paper is less complex than conventional deinking processes involving washing and flotation procedures.

It will be recognized by those skilled in the art that the invention has wide application in deinking a variety of printed paper to produce recycled paper.

Numerous modifications are possible in light of the above disclosure such as application of alternative agglomeration deinking chemicals chosen according to the wastepaper treated. In addition, alternative process parameters may be employed in the invention, which include using the deinking agent with no pH adjustment to the wastepaper; using the deinking agent in an alkali pH range; or using the deinking agent in the presence of other chemicals suitably employed in a deinking and/or papermaking process such as bleaching agents, defoamers, sizing agents, brighteners, water quality processing agents among others.

Therefore, although the invention has been described with reference to certain preferred embodiments, it will be appreciated that other composite structures and processes for their fabrication may be devised, which are nevertheless within the scope and spirit of the invention as defined in the claims appended hereto.

We claim:

1. A method to deink printed paper comprising the steps of:

repulping the printed paper in a repulping vessel to produce a pulp medium;

contacting said pulp medium with an aqueous medium containing a deinking chemical, wherein the presence of said deinking chemical causes initial agglomeration of ink particles to produce an ink pulp medium;

passing said ink pulp medium through a screen or centrifugal cleaner to remove large ink particles from said ink pump medium;

passing said ink pulp medium through a centrifugal cleaner to remove fine ink particles to produce a fine ink particles stream;

recirculating said fine ink particles stream to said pulp medium to cause additional agglomeration of ink particles from said fine ink particle stream and said pulp medium, wherein reagglomerated ink particles are removed to produce a substantially ink free pulp medium.

2. The method as defined in claim 1, wherein said repulping of the printed paper is carried out from a time between 5 to 60 minutes at consistencies in the range of 3–30%.

3. The method as defined in claim 1, wherein said aqueous medium is maintained at a pH in the range of 7–11.5 and at temperatures in the range of 30°–80° C.

4. The method as defined in claim 1, wherein said deinking chemical is present at a dosage ranging from between 0.1–2.0% by weight, calculated on the dry weight of the pulp used.

5. The method as defined in claim 1, wherein said repulping and said initial agglomeration are done simultaneously in said repulping vessel to produce said ink pulp medium.

6. The method as defined in claim 5, comprising a further step of passing said ink pulp medium through a lights removal cleaner to remove lightweight contaminants and treating lightweight rejects with said deinking chemical to cause small lightweight contaminants to agglomerate with said ink particles to form agglomerated contaminants.

7. The method as defined in claim 6, comprising a further step of reintroducing said agglomerated contaminants into said pulp medium, wherein said contaminants act as a seed material around which said ink particles agglomerate.

8. The method as defined in claim 7, comprising a further step of removing said agglomerated contaminants through screening and centrifugal cleaning procedures.

9. The method as defined in claim 5, comprising a further step of recirculating said fine ink particle stream into said repulping vessel in the presence of said deinking chemical and stream to cause additional agglomeration of ink particles.

10. The method as defined in claim 1, wherein said pulp medium is passed to an agglomeration tower containing said deinking chemical to produce said ink pulp medium.

11. The method as defined in claim 10, comprising a further step of passing said pulp medium through screening or cleaning procedures to remove coarse contaminants.

12. The method as defined in claim 10, comprising a further step of recirculating said fine ink particle stream into said agglomeration tower in the presence of said deinking chemical and steam to cause additional agglomeration of ink particles.

13. The method as defined in claim 12, comprising a further step of bleaching said fine ink particle stream in said agglomeration tower.

14. The method as defined in claim 1, comprising the further step of passing said ink pulp medium, at consistencies ranging from 0.5–6.0%, and temperatures from 25°–55° C. through slotted pressured screens to remove contaminants and large ink particles.

15. The method as defined in claim 1, wherein said ink pulp medium is passed through a centrifugal cleaner to remove ink particles denser than water to produce said fine ink particle stream.

16. The method as defined in claim 1, comprising a further step of producing a paper product from said ink free pulp medium by conventional papermaking techniques.

17. The method as defined in claim 1, wherein said fine ink particle stream is recirculated to said repulping vessel, with further application of said deinking chemical, to cause additional agglomeration of said ink particles.

18. The method as defined in claim 17, comprising a further step of mixing said fine ink particle stream with the printed paper and repulping simultaneously.

19. The method as defined in claim 1, comprising a further step of mixing said fine ink particle stream with said pulp medium and recirculating to an agglomeration tower, with further application of said deinking chemical, to cause additional agglomeration of said ink particles.

20. The method as defined in claim 1, comprising a further step of contacting said fine ink particle stream with said deinking chemical to cause reagglomeration of said fine ink particles, wherein said reagglomerated fine ink particle stream is recirculated to said pulp medium to cause additional agglomeration of said ink particles.

21. The method as defined in claim 20, wherein reagglomeration of said fine ink particle stream is at 40°–95° C. for 0.5 to 60 min.

22. The method as defined in claim 20 wherein said reagglomerated fine ink particle stream is recirculated to said repulping vessel, with further application of said deinking chemical, to cause additional agglomeration of said ink particles.

23. The method as defined in claim 22, comprising a further step of mixing said reagglomerated fine ink particle stream with the printed paper and repulping simultaneously.

24. The method as defined in claim 20, wherein said reagglomerated fine ink particle stream is mixed with said pulp medium and is recirculated to an agglomeration tower, with further application of said deinking chemical, to cause additional agglomeration of said ink particles.

* * * * *